(12) United States Patent
Levering

(10) Patent No.: US 11,845,114 B2
(45) Date of Patent: Dec. 19, 2023

(54) EXPANDABLE DEVICE FOR DEFOULING TUBULAR MEMBERS

(71) Applicant: Vrad Levering, Oakland, CA (US)

(72) Inventor: Vrad Levering, Oakland, CA (US)

(*) Notice: Subject to any disclaimer, the term of this patent is extended or adjusted under 35 U.S.C. 154(b) by 0 days.

(21) Appl. No.: 17/636,689

(22) PCT Filed: Aug. 26, 2020

(86) PCT No.: PCT/US2020/048053
§ 371 (c)(1),
(2) Date: Feb. 18, 2022

(87) PCT Pub. No.: WO2021/041579
PCT Pub. Date: Mar. 4, 2021

(65) Prior Publication Data
US 2022/0288655 A1 Sep. 15, 2022

Related U.S. Application Data

(60) Provisional application No. 62/892,030, filed on Aug. 27, 2019, provisional application No. 62/891,584, filed on Aug. 26, 2019, provisional application No. 62/891,579, filed on Aug. 26, 2019.

(51) Int. Cl.
*B08B 9/027* (2006.01)
*B08B 3/08* (2006.01)
(Continued)

(52) U.S. Cl.
CPC ............... *B08B 9/027* (2013.01); *B08B 3/08* (2013.01); *B08B 17/06* (2013.01); *F16L 55/24* (2013.01)

(58) Field of Classification Search
CPC . B08B 9/027; B08B 3/08; B08B 17/06; F16L 55/24
See application file for complete search history.

(56) References Cited

U.S. PATENT DOCUMENTS 3,075,535 A * 1/1963 Lasting ................. B08B 9/0322
285/97
4,787,659 A * 11/1988 Durham .................... E03C 1/30
294/98.1
(Continued)

FOREIGN PATENT DOCUMENTS

CN 108916530 A * 11/2018 .............. F16L 55/24
EP 1703182 A1 9/2006
(Continued)

OTHER PUBLICATIONS

International Search Report issued in International Patent Application No. PCT/US2020/048053 dated Nov. 20, 2020.
(Continued)

*Primary Examiner* — Sharidan Carrillo
(74) *Attorney, Agent, or Firm* — United IP Counselors, LLC

(57) ABSTRACT

A defouling device for mechanically disrupting fouling material for removal from a pipe or other a tubular member. The defouling device has inflatable portions capable of expanding to mechanically disrupt fouling material within a pipe. The defouling device may be attached to an inner luminal surface of the pipe or formed with the pipe. The defouling device expands circumferentially and radially to mechanically disrupt fouling material. The defouling device may also controllably expand longitudinally to mechanically disrupt fouling material and peristaltically pump fouling material through and out of the pipe.

10 Claims, 15 Drawing Sheets

(51) Int. Cl.
  *B08B 17/06*   (2006.01)
  *F16L 55/24*   (2006.01)

(56) References Cited

U.S. PATENT DOCUMENTS

| | | | |
|---|---|---|---|
| 6,286,172 B1 * | 9/2001 | Castagnoli | B08B 9/0436 |
| | | | 15/104.19 |
| 6,389,613 B1 * | 5/2002 | Comas | B08B 9/0322 |
| | | | 4/255.06 |
| 10,207,299 B2 | 2/2019 | Lopez et al. | |
| 2005/0000593 A1 * | 1/2005 | Shaltiel | F16L 55/128 |
| | | | 141/382 |
| 2011/0098660 A1 | 4/2011 | Porreca, Jr. | |
| 2014/0230854 A1 | 8/2014 | Lopez et al. | |
| 2018/0087350 A1 * | 3/2018 | Sherman | C08K 3/08 |
| 2018/0289924 A1 | 10/2018 | Levering et al. | |

FOREIGN PATENT DOCUMENTS

| | | | | |
|---|---|---|---|---|
| KR | 101786264 B1 | 10/2017 | | |
| WO | WO-2012145422 A1 * | 10/2012 | | F16L 55/165 |
| WO | WO-2013049626 A1 * | 4/2013 | | A01N 25/34 |
| WO | WO-2014100917 A1 * | 7/2014 | | A61F 11/006 |

OTHER PUBLICATIONS

Levering, Vrad, "Design and Development of an Anti-fouling Urinary Catheter Utilizing Active Surface Deformation", Duke University, 2015, pp. 1-131.
Levering, Vrad, et al., "Soft Robotic Concepts in Catheter Design: an On-demand Fouling-release Urinary Catheter", NIH Public Access, Oct. 2014, vol. 3, Issue 10, pp. 1-18.
Levering, Vrad, et al., "Urinary catheter capable of repeated on-demand removal of infectious biofilms via active deformation", Biomaterials, vol. 77, 2016, pp. 77-86.
Maskarinec, Stacey A., et al, "On-demand release of Candida albicans biofilms from usrinary catheters by mechanical surface deformation", Biofouling, 2018, vol. 34, Issue 6, pp. 595-604.
Shivapooja, P., et al., "Bioinspired Surfaces with Dynamic Topography for Active Control of Biofouling", Advanced Materials, 2013, 25, pp. 1430-1434.
Written Opinion issued in International Patent Application No. PCT/US2020/048053 dated Nov. 20, 2020.

* cited by examiner

EXPANDABLE DEVICE FOR DEFOULING TUBULAR MEMBERS

CROSS-REFERENCE TO RELATED APPLICATIONS

This application claims priority to U.S. Provisional Application No. 62/891,584, filed Aug. 26, 2019; U.S. Provisional Application No. 62/891,579, filed Aug. 26, 2019; and U.S. Provisional Application No. 62/892,030, filed Aug. 27, 2019. The contents of each of these provisional applications are incorporated by reference in their entirety.

TECHNICAL FIELD

The invention relates to expandable devices for defouling an inner lumen of a tubular member.

BACKGROUND

Pipes and other types of rigid and flexible tubes have long been used to transport various fluids from one location to another. As fluid and fluid/solid mixtures flow through pipes and tubes, material can be deposited on the walls of the pipe or tube. Material deposition can occur as a result of materials settling out of the flow, as a result of chemical reactions, by adhesion of microorganisms, and by other mechanisms. The general process by which unwanted material builds up on the sidewalls of pipes and tubes is referred to here as fouling.

Pipe fouling can cause reduced flow through the pipe as fouling material builds up and constricts the pipe lumen. Additionally, material flowing through the pipe may become contaminated with the fouling material. Contamination is especially troublesome in agricultural applications, such as dairy production, where both chemical and microbial contamination can spoil or degrade the quality or taste of dairy products.

Removing fouling material has proven difficult. One approach to address this problem is chemically-mediated defouling. In a typical approach, caustic agents are flowed through a pipe to strip biofilms from pipes. This method of defouling proves costly as the caustic agents are expensive to acquire and handle, are harmful to the environment, and can degrade the pipe being defouled.

If the fouling material is bacterial, antibiotics or other chemical sanitizing agents may be flowed through the pipe to clear the contamination. This method often meets with limited success, because bacteria adhering to the walls of a tube or pipe often form an extracellular polysaccharide film or matrix that acts to protect the underlying microorganisms from the antibiotics or other sanitizing agents. The presence of the extracellular protective matrix may require antibiotic concentrations 100 times greater than that required to kill a liquid-borne bacterial phenotype, besides which, the overuse of antibiotics contributes to the evolution of antibiotic-resistant strains of microorganisms.

The present inventor has investigated a mechanical approach for removing biofilms from urinary catheters (Levering, Vrad. "Design and Development of an Anti-fouling Urinary Catheter." Diss. Duke U, 2015). A proof-of-concept urinary catheter with inwardly expanding inflation lumens was extruded from silicone elastomer. Expansion of the inflation lumens proved effective for removing biofilm from the urinary catheter in vitro.

Although positive results have been obtained in urinary catheters, these devices often have a relatively small lumen, and the catheters in question are extruded with the inflation lumens as an integral part. This solution is not necessarily suitable for a broader range of pipes and tubes.

BRIEF SUMMARY

One aspect of the invention relates to a defouling device for mechanically disrupting and removing fouling material from a pipe. In one embodiment, the defouling device has a base with longitudinally extending ribs and channels and an expandable member attached to the ribs so as to cover a radially inner surface of the base. In another embodiment, the defouling device defines expandable cells that are inflated to mechanically disrupt fouling material. The defouling device may be attached to an inner luminal surface of the pipe or formed with the pipe.

In another aspect of the invention, the defouling device is connected to an inflation apparatus providing inflation media to the channels to expand the expandable member. The inflation apparatus includes a pressure source, a controller, and a manifold with at least one output to controls the manner in which the defouling device, or portions thereof, expand to disrupt fouling material.

In another aspect of the invention, inflation of the defouling device causes a change in the shape of the defouling device, rubbing contact between expanded portions of the defouling device, and/or strains in the material of the defouling device that contribute to mechanical disruption of fouling material.

In a further aspect of the invention, the defouling device controllably inflates longitudinally and radially to mechanically disrupt fouling material and peristaltically pump fouling material through and out of the pipe. In some embodiments, the thickness of an inner wall of the defouling device changes along the length of the defouling device to control longitudinal expansion of the defouling device. In another embodiment, mechanical properties of the defouling device are varied along the length of the defouling device to control longitudinal expansion.

In another aspect of the invention, the defouling device is configured as a defouling gasket. Inflation of the defouling gasket mechanically disrupts fouling material around the gasket. The defouling gasket is shaped to effectively seal a pipe or pipe joint.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the description, and in which:

The invention will be described with respect to the following drawing figures, in which like numerals represent like features throughout the description, and in which.

DETAILED DESCRIPTION

Figure 1:
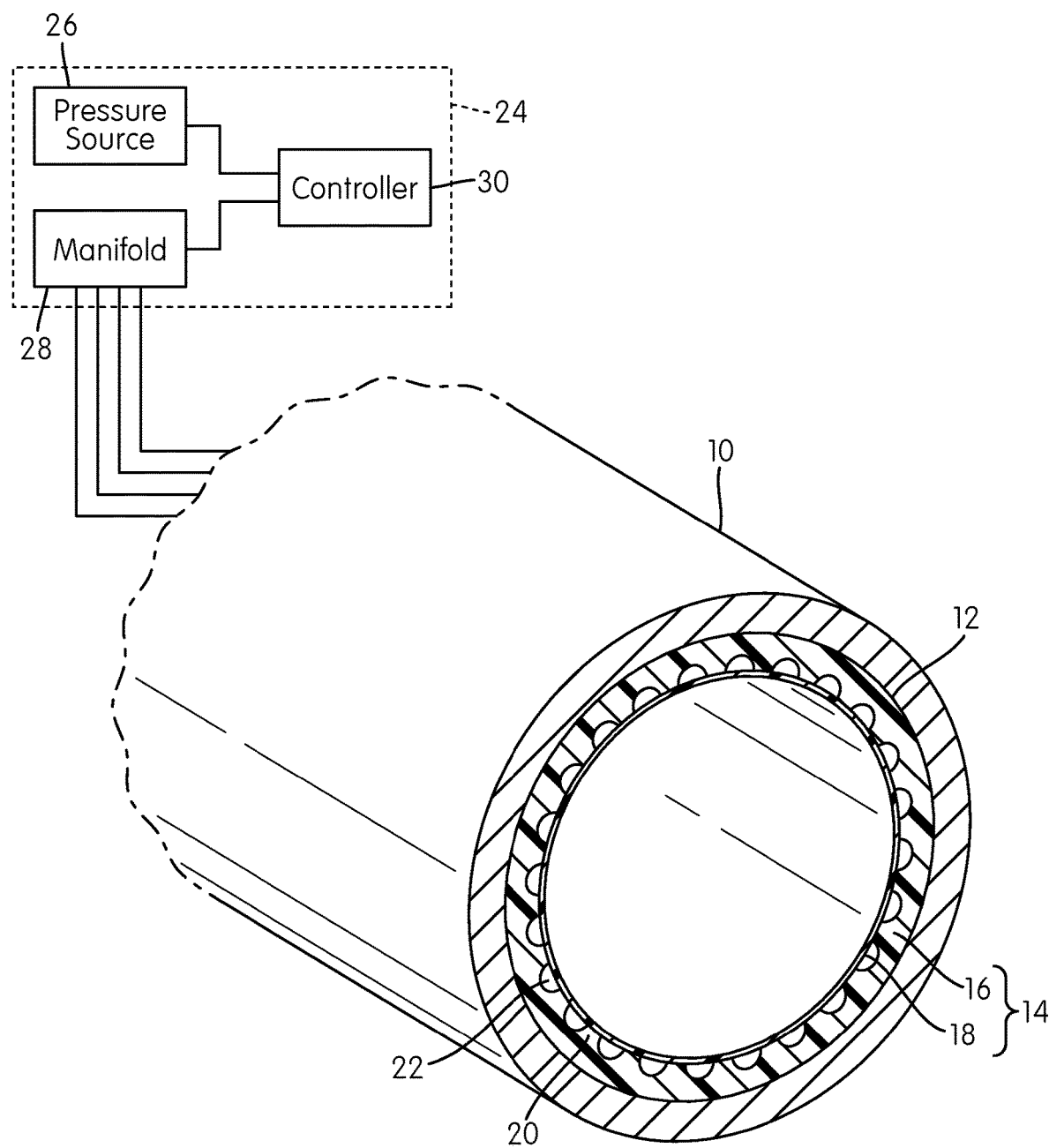
FIG. 1 is a perspective view of a pipe and a defouling device according to an embodiment of the invention.

FIG. 1 is a perspective view of a pipe 10 with an inner luminal surface 12 supporting an expanding defouling device 14 according to an embodiment of the invention. In some embodiments, pipe 10 is formed of a rigid or high tensile material, such as steel, or a rigid plastic, such as in PVC pipe. In other embodiments, pipe 10 may be formed of a flexible material, such as an elastomer. For the purposes of this description, the term "pipe" should be interpreted broadly to encompass any device having an enclosed or unenclosed lumen or channel through which material can be flowed. The material of which the pipe 10 is made is not critical, so long as it is suitable for its application.

Defouling device 14 includes a base 16 and an expandable member 18. Base 16 may be formed separately from pipe 10 from an elastomer or other material suitable for attachment to the interior of pipe 10, such as by an adhesive, lamination, or other forms of bonding. Base 16 may be attached to the interior of pipe 10 at the time of manufacture, or pipe 10 may be retrofit with defouling device 14 once in service.

In some embodiments, base 16 may be formed of the same material as pipe 10, such as by extruding, molding, or other suitable methods. Even if the material of base 16 and the material of pipe 10 are not the same, if the two materials are, e.g., compatible thermoplastics, they may be co-extruded, co-molded, or made using other such processes. (Here, the term "compatible" refers to the ability of the two materials to be used together in the same process.) In other embodiments, base 16 could be formed separately from pipe 10. For example, an adhesive layer may be applied to inner luminal surface 12 to adhere base 16 to pipe 10. Alternatively, base 16 may be bonded to the inner luminal surface 12 of pipe 10 in some other fashion. Depending on the materials involved, thermal fusing, solvent bonding, and attachment with fasteners are all possible.

Base 16 includes ribs 20 and channels 22 extending along a length of defouling device 14. Channels 22 are connected to an inflation apparatus 24 and function as inflation lumens to expand defouling device 14, as described in further detail below. In some embodiments, ribs 20 and channels 22 extend along the entire length of defouling device 14. In other embodiments, ribs 20 and channels 22 only extend along part of the length of defouling device 14. If ribs 20 and channels 22 extend along only part of the length of defouling device 14, it may be advantageous, for example, to place them where the largest buildups of fouling material occur.

In FIG. 1, each channel 22 is shown having a generally semi-circular shape. In other embodiments, channels 22 may have a polygonal or other shape. In further embodiments, a base could include channels having combinations of different shapes. The channels may have any shape so long as an inflation medium can flow through them. That inflation medium may comprise air or a gas like nitrogen, water, hydraulic oil, or some other compressible or incompressible fluid, depending on the embodiment.

The number and circumferential positioning of channels 22 may be selected to cause defouling device 14 to inflate at the positions and to the extents most effective for mechanically removing the fouling material from the pipe 10. The embodiment of FIG. 1 includes twenty-four channels 22 evenly spaced about the circumference of base 16. Base 16 may include more or fewer channels 22 at any circumferential interval about base 16. In its simplest form, base 16 could include only a single channel 22 for inflating defouling device 14. In some embodiments, base 16 may include up to one hundred or more channels 22. Providing a larger number of channels 22 allows for more selectivity in where the defouling device 14 is actuated to remove fouling material. Additionally, the resulting smaller channels 22 can be inflated to greater strain levels than a comparable larger channel 22 without occluding the lumen of pipe 10.

In other embodiments, two or more channels 22 are positioned at differing intervals so that channels 22 are not evenly circumferentially spaced. Thus if, for example, experience shows that fouling material deposits unevenly around the circumference of the pipe 10, defouling device 14 could be structured and installed so as to place more channels 22 in the areas that are most affected by fouling.

Expandable member 18 covers channels 22 along a radially inner surface of base 16 and connects with ribs 20. Expandable member 18 may be attached to ribs 20 in any suitable manner, such as by an adhesive, lamination, or other forms of bonding. In some applications, expandable member 18 may be formed integrally with base 16, such as by extruding, molding, or other suitable methods.

In some embodiments, expandable member 18 is formed from an elastomeric material. As will be described in more detail below, an elastomeric expandable member 18 can expand from an undeformed configuration to an expanded configuration so as to mechanically disrupt fouling material, and then return to the undeformed configuration. The mechanical disruption process may rely on stretch of expandable member 18, gross shape change of expandable member 18, or both, as will be described below in more detail.

The elastomer used in any particular embodiment will depend on a number of factors, including the operating pressure, the nature of the material flowing through the pipe, the material of the pipe, the chemistry of the area (e.g., acidic, basic, etc.), the temperature, and the expected thickness of fouling on pipe 10. As those of skill in the art will understand, the elastomer selected for any particular application should be able to withstand the physical and chemical environment and have sufficient strength in that environment to cause mechanical fracture of any fouling that deposits on pipe 10. In various embodiments, the elastomer may be, for example, natural rubber, styrene-butadiene rubber, butyl rubber, ethylene-propylene (EPDM) rubber, neoprene, nitrile, silicone, fluorocarbon rubbers, fluoro-silicone rubbers, or urethanes. Coupled with an appropriate inflation apparatus, an elastomeric expandable member may be able to generate significant pressures quickly. For example, an elastomer such as a 1 mm thick silicone may be able to generate about 20 kPa in pressure, whereas a thicker-walled member, such as a higher-durometer fluoroelastomer with a wall thickness of 3 mm may be able to generate pressures on the order of 300 kPa.

In some applications, any combination of pipe 10, base 16, and/or expandable member 18 may be formed integrally as one piece. For example, pipe 10, base 16, and expandable member 18 may be extruded from an elastomeric material, such as silicone or polyurethane.

Defouling device 14 is connected to an inflation apparatus 24. Briefly, inflation apparatus 24 comprises a pressure source 26, a flow selector 28, and a controller 30. Pressure source 26 is typically either a pneumatic or hydraulic pump, fan, or blower. Flow selector 28 may be, e.g., a manifold 28 that allows inflation apparatus 24 to selectively pressurize channels 22 individually or in groups. For that reason, manifold 28 may have multiple outputs 32. Of course, in the simplest embodiments, flow selector 28 may be a valve or another such component that opens to allow inflow and outflow and closes to keep channels 22 inflated for the requisite time. A controller 30 controls pressure source 26 and flow selector 28. In some embodiments, controller 30 may comprise sets of mechanical or electromechanical switches or levers. In other embodiments, controller 30 may comprise a computing device that actuates pressure source 26 and flow selector 28 electronically and is itself controllable by another device.

Inflation apparatus 24 is in fluid communication with channels 22 to inflate defouling device 14, as will be described later in further detail. Of course, there may be multiple inflation apparatuses 24 attached to a single defouling device 14.

In some embodiments, two or more channels 22 may be connected by a small opening or passage (not shown in FIG. 1) in base 16 such that inflation medium may flow between connected channels 22 and pressures can be equalized between connected channels 22. Channels 22 may be connected at one or more locations along the length of defouling device 14. For example, two ore more channels 22 may be connected by a small opening or passage therebetween at a proximal end of defouling device 14, at a distal end of defouling device 14, at a location intermediate the proximal and distal ends of defouling device 14, or any combination thereof. Typically, only those channels 22 that are designed to inflate together will have such passages between them. The presence of such passages may reduce or eliminate the need for a flow selector or manifold 28 by forming a kind of internal manifold to distribute pressure between channels 22.

Figure 2:
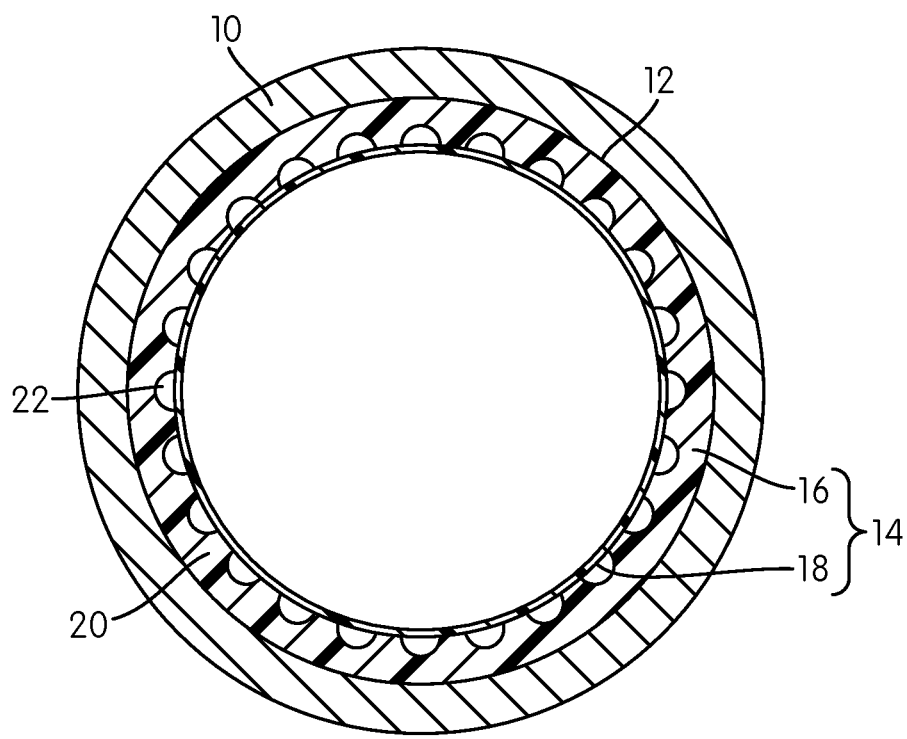
FIGS. 2-4 are cross-sectional views of the pipe and defouling device of FIG. 1 illustrating the defouling device removing fouling material from the pipe.
Figure 3:
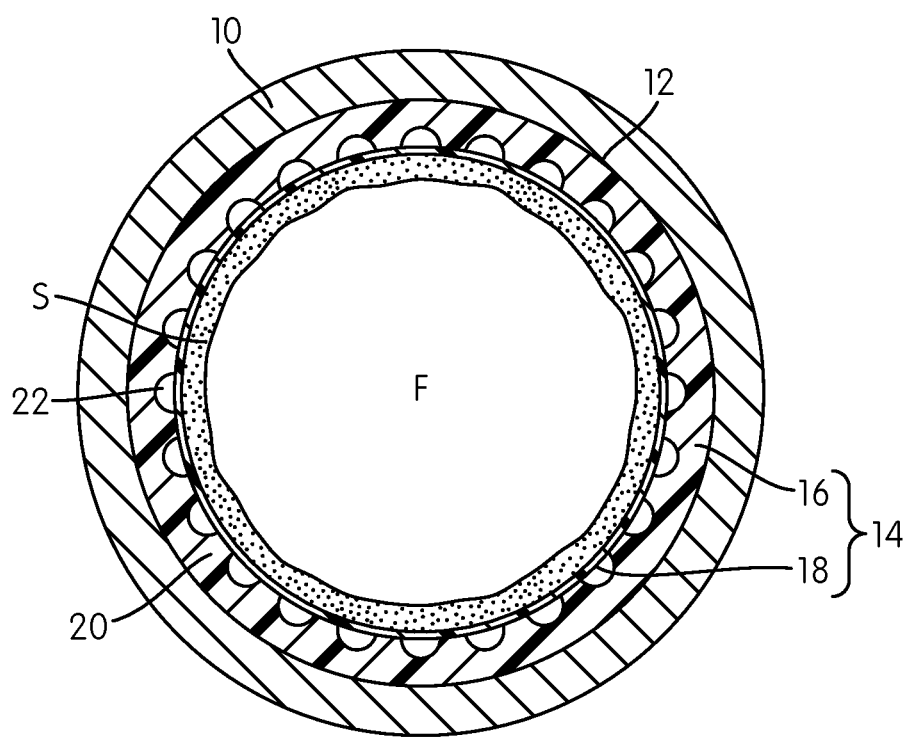
Figure 4:
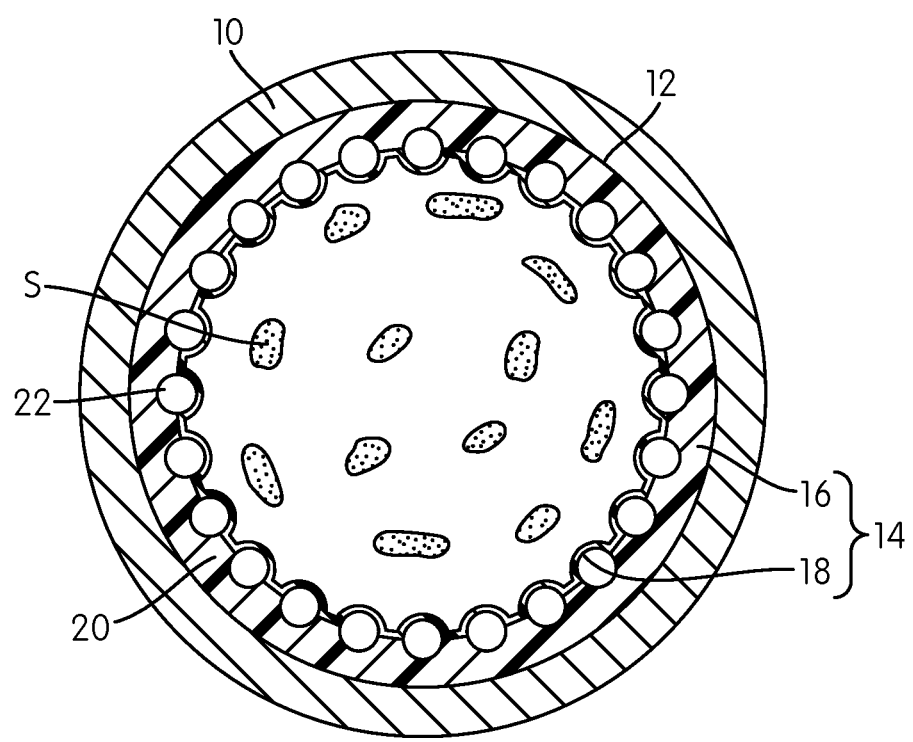

FIGS. 2-4 are cross-sectional views of pipe 10 and defouling device 14 illustrating the manner in which defouling device 14 is expanded to remove fouling material S from pipe 10. As shown in FIG. 2, expandable member 18 normally has an undeformed configuration forming a flow path F for material to flow through pipe 10. Over time, fouling material S can accumulate along expandable member 18, as it would along the interior of the pipe 10 itself, as illustrated in FIG. 3. The fouling material S constricts flow path F and can contaminate material flowing through the pipe 10. When removal of the fouling material S is desired, an inflation medium, typically a gas or hydraulic liquid, is introduced into channels 22 to inflate defouling device 14 and expand regions of the expandable member 18 between ribs 20. Expansion of expandable member 18 mechanically disrupts and detaches fouling material S from the expandable member 18 and the pipe 10. FIG. 4 shows the detached fouling material free to flow out of pipe 10. Once fouling material S has been cleared, the inflation medium can be removed from channels 22 to deflate defouling device 14 so that expandable member 18 returns to the undeformed configuration. Defouling device 14 may be inflated and deflated a number of times to remove an amount of fouling material S suitable to substantially restore flow path F.

Figure 5:
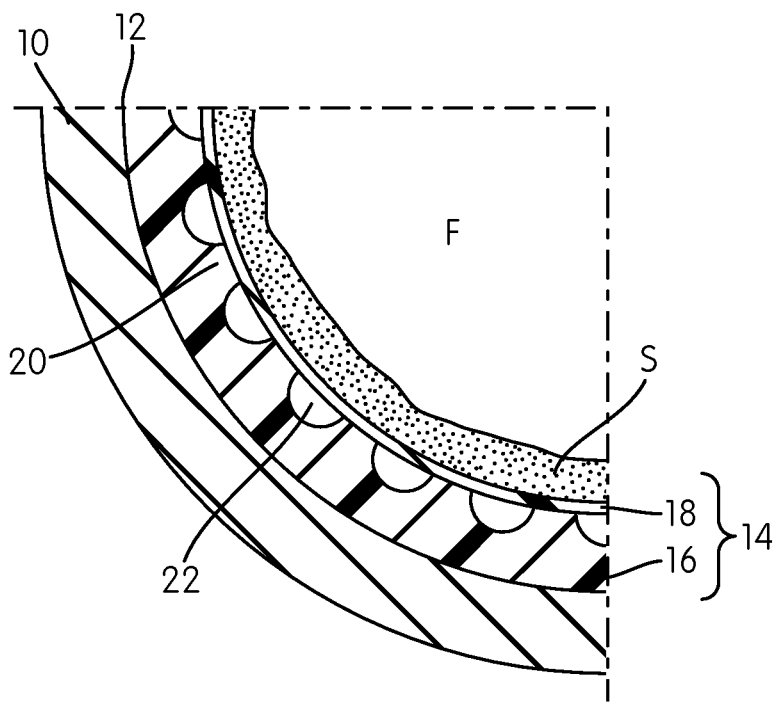
FIGS. 5 and 6 are quarter-sectional views of the pipe and defouling device of FIG. 1 illustrating mechanisms of disrupting and detaching fouling material from the pipe.
Figure 6:
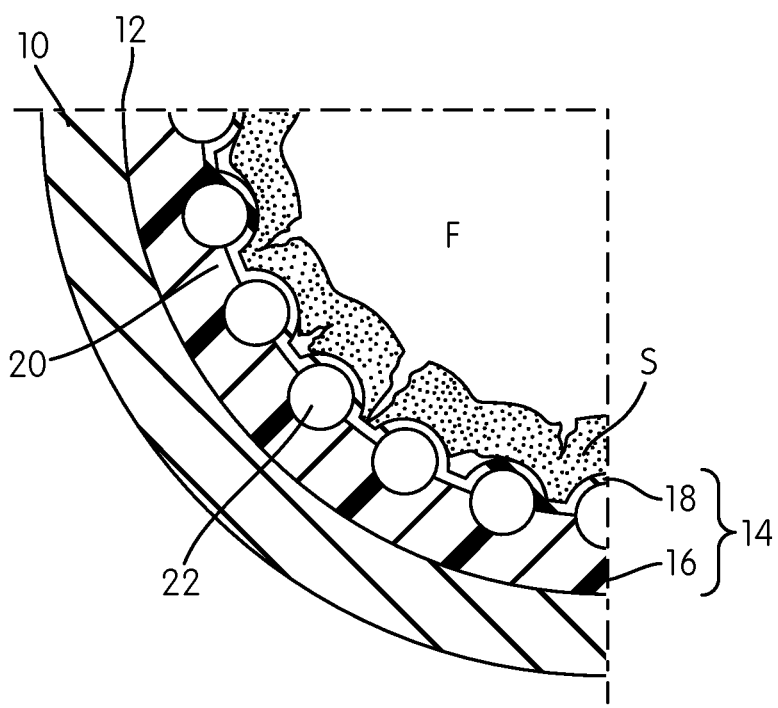

FIGS. 5 and 6 are quarter-sectional views of pipe 10 and defouling device 14 illustrating mechanisms of disrupting and detaching fouling material S from the expandable member 18. As described briefly above, the inflation of expandable member 18 mechanically fractures and dislodges fouling material. This may occur due to a number of different mechanisms, including shape changes and strain induced in the fouling material by expansion of expandable member 18. While the present inventor does not wish to be bound by any particular theories of operation, and the precise mechanism that dislodges fouling material is immaterial as long as it is effective to dislodge the fouling material, certain potential mechanisms of action of the expandable member 18 are presented here for the sake of description and understanding.

In one mechanism, the change in shape experienced by expandable member 18 lifts and separates portions of fouling material S therefrom and contributes to breaking, rupturing, cracking, or otherwise disrupting the structure of fouling material S. Additionally, an expanded region of expandable member 18 may change shape to contact another region of expandable member 18 to cause rubbing therebetween, contributing to disruption of fouling material S.

In a further aspect, circumferential strain in the material of expandable member 18 contributes to disruption and detachment of fouling material S therefrom. The inflation medium introduced into channels 22 increases pressure exerted on expandable member 18 so that expandable member 18 deforms and stretches circumferentially about and radially inward of base 16. The strain along expandable member 18 during radial and circumferential stretching induces shape changes and strain in fouling material S, thus contributing to breaking, rupturing, cracking, or otherwise disrupting the structure of fouling material S.

As was noted briefly above, suitable elastomeric materials for expandable member 18 may be able to repeatably withstand strains at pressures in the range of about 20 kPa to about 300 kPa. The thickness of expandable member 18 contributes to its ability to withstand such pressures. In some embodiments, expandable member 18 may have a thickness from at least about 1.5 mm to about 6 mm.

The present inventor has found that, at least for some kinds of biofilms, the efficacy of fouling disruption and removal depends, at least in part, on the applied strain and on the strain rate. Generally speaking, the greater the strain rate, the more effective the fouling disruption may be. With respect to applied strain, the expandable member 18 may sustain a significant amount of stretching/strain when inflated, limited only by the material's ability to sustain large strains. In some embodiments, suitable elastomeric materials may experience strains of 100% or more when inflated to disrupt fouling material. In other embodiments, the expandable member 18 may experience stretch of at least about 30% to disrupt fouling material. In further embodiments, a strain between about 10% and about 15% to effectively disruption of biofilms. The level of strain necessary to achieve the effect of disrupting and removing fouling in any particular case will depend on the nature of the fouling, its thickness, and other factors. Generally speaking, it is advantageous to use the minimal level of strain in the expandable member 18 that will successfully dislodge the fouling material, either in a single cycle or over a defined, finite number of cycles during a single defouling procedure. Use of large strains may reduce the number of cycles that an expandable member can sustain before failure from fatigue.

In a still further aspect, longitudinal strain experienced in expandable member 18 contributes to disruption and detachment of fouling material S. As pressure exerted on expandable member 18 increases due to inflation medium introduced into channels 22, expandable member 18 deforms and stretches longitudinally along defouling device 14. The strain along expandable member 18 during longitudinal stretching induces shape changes and strain in fouling material S to contribute to breaking, rupturing, cracking, or otherwise disrupting the structure of fouling material S.

As was described briefly above, the specific number and position of channels 22 can be selected based on a number of considerations including, but not limited to, the type of fouling material to be removed, the diameter of the flow path F, and the desired amount of expansion of expandable member 18.

For ease in illustration and description, FIGS. 3-6 show that fouling S breaks up after a single cycle of inflation. That may not, and need not, be the case in all embodiments. In many cases, the expandable member 18 may be inflated a number of times (e.g., two times, five times, ten times, etc.) during a single defouling procedure. Additionally, the manner in which individual channels 22 are inflated may differ from cycle to cycle during the procedure. In some embodiments, channels 22 may be inflated at varying rates to dislodge varying types of fouling material depending on the fouling materials' mechanical properties. This is especially advantageous when fouling is multi-material, such as fungal and bacterial, bacterial and crustacean, bacterial and chemical mediated, etc.

Figure 7:
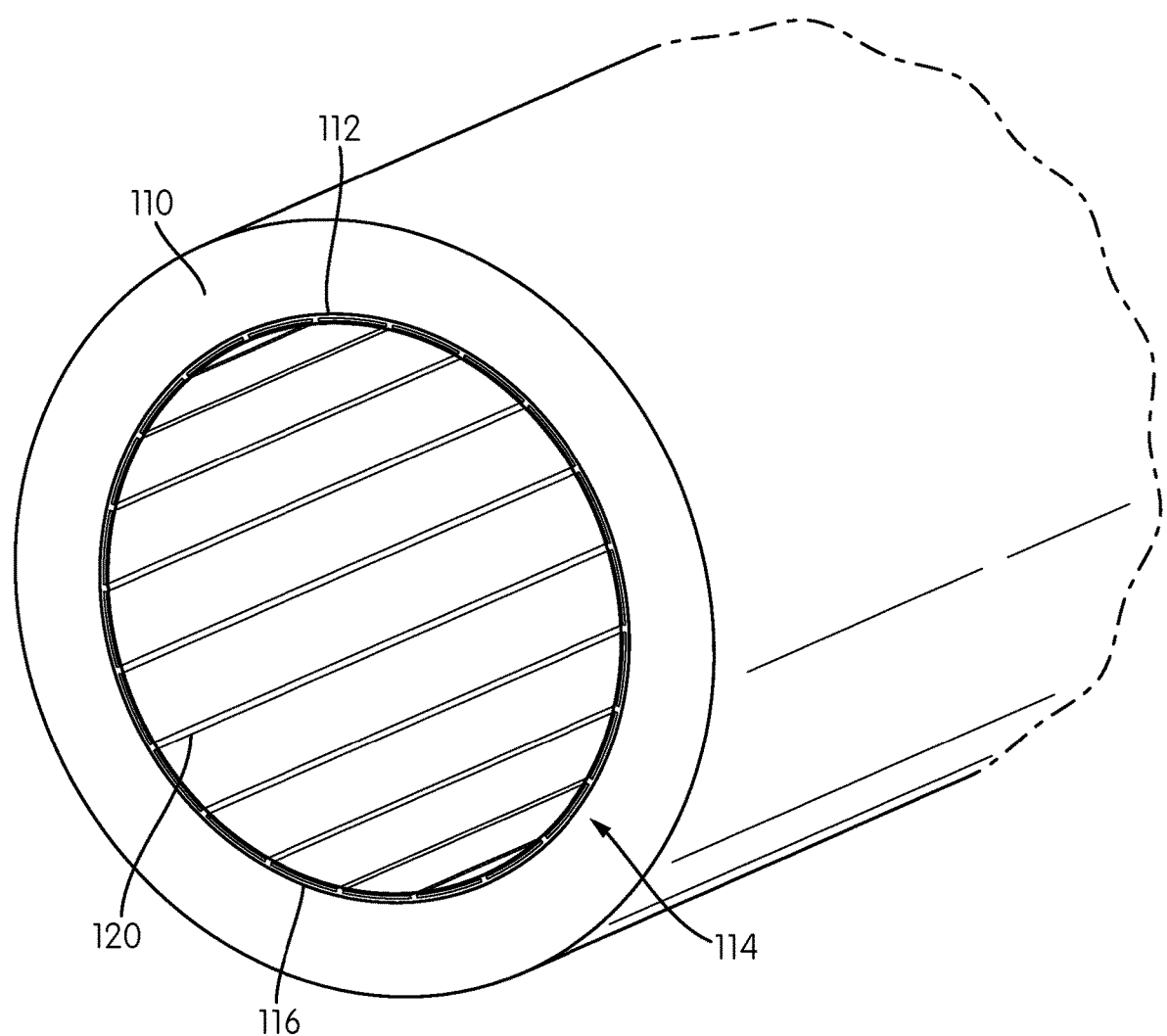
FIGS. 7-10 are perspective views of a pipe and defouling device according to another embodiment of the invention.
Figure 8:
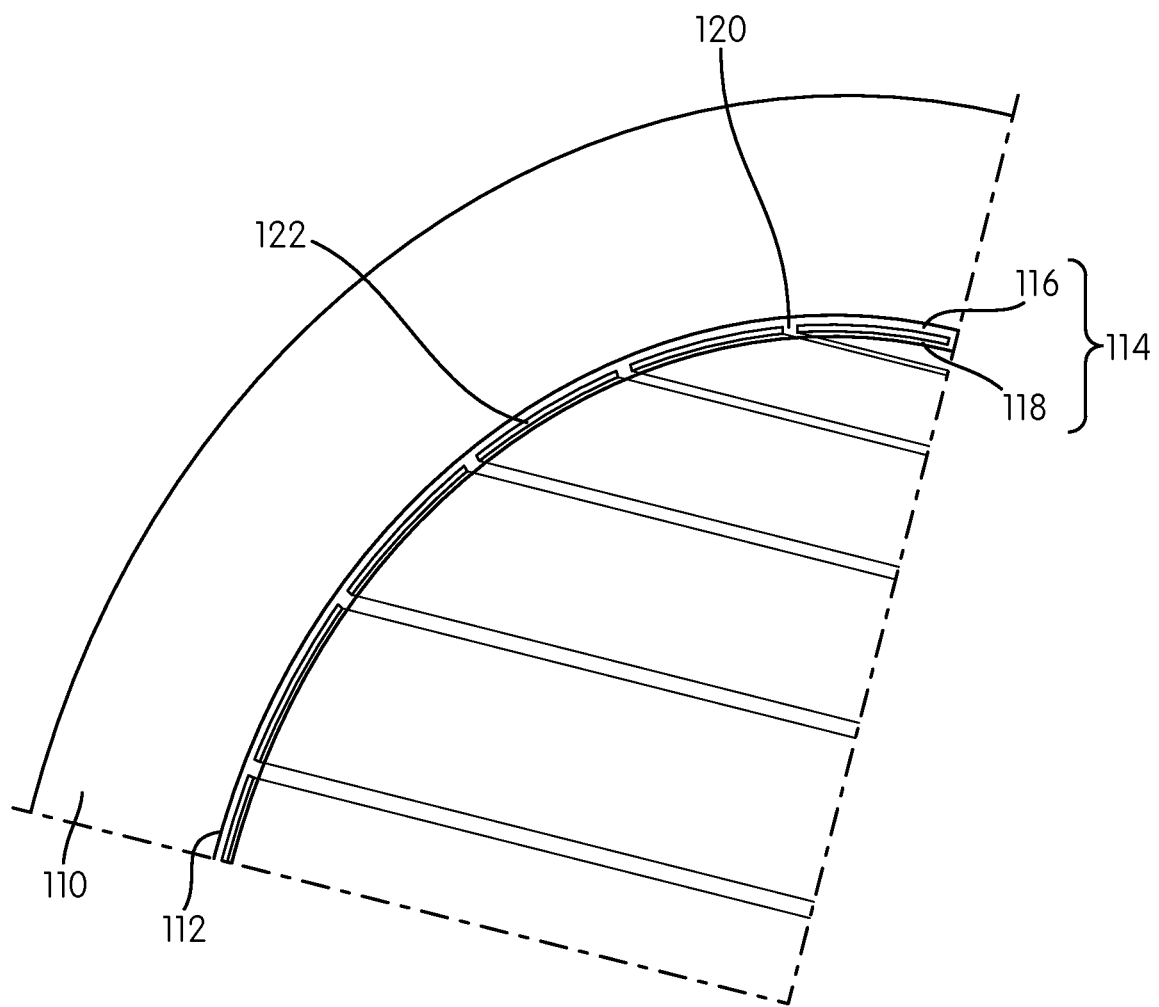
Figure 9:
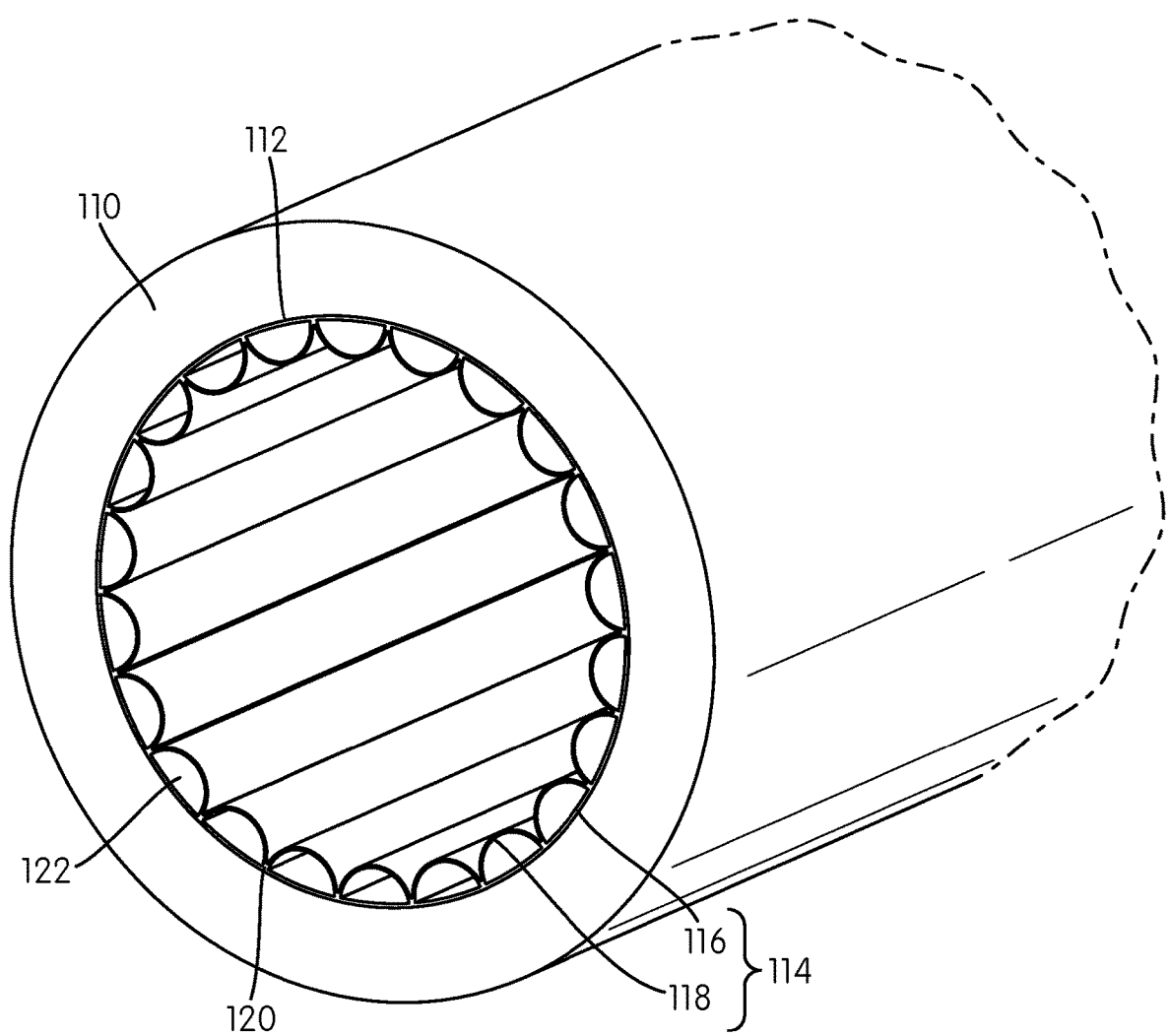
Figure 10:
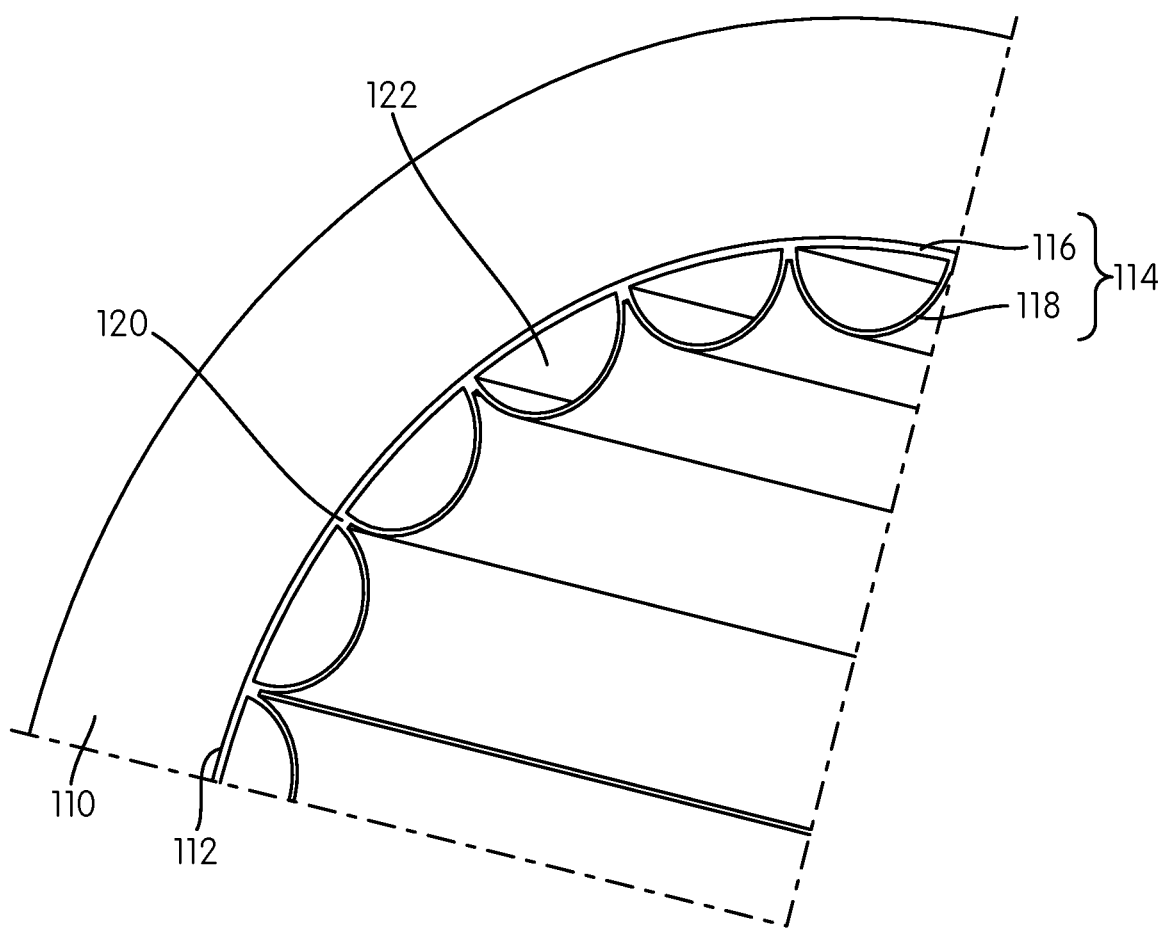

FIGS. 7-10 are perspective views of a pipe 110 with an intraluminal surface 112 supporting a defouling device 114 according to another embodiment. In this embodiment, defouling device 114 includes an outer wall 116 integrally formed with an inner wall 118 to form seams 120 that separate a number of expandable cells 122. FIGS. 7 and 8 show defouling device 114 in an unexpanded state. FIGS. 9 and 10 show cells 122 expanding into a flow path F of pipe 110. Cells 122 are inflated to the expanded state to the expanded state to remove fouling material from pipe 110.

As briefly described above, an inflation apparatus controls the manner in which a defouling device expands. The inflation apparatus may be configured to independently inflate cells separately or in groups, thus allow cells to inflate in various patterns to disrupt fouling material. In one application, an inflation medium may be introduced to simultaneously expand cells 122. In some applications, sequential expansion of one or more cells 122 may facilitate disruption of fouling material. For example, an inflation apparatus may be configured to expand a first group of one or more cells 122 and a second group of one or more cells 122. The inflation apparatus may expand the first group simultaneously or sequentially with the second group. The inflation apparatus may also be configured to expand the second group of cells 122 while the first group of cells 122 expands or remains expanded, or while the first group of cells 122 deflates, or after the first group of cells 122 is deflated, or any combination thereof. In one embodiment, circumferentially alternating cells 122 may be inflated in alternating cycles to deflect and dislodge fouling from areas of inner wall 118 overlying seams 120 between cells 122.

Additionally, the inflation apparatus may be configured to inflate more than two groups of cells 122 (e.g., three groups, four groups, five groups, etc.) simultaneously or sequentially. The inflation apparatus may be configured to inflate each separate cell 122 simultaneously or sequentially. The ability to independently inflate and deflate separate cells or groups of cells would also allow a defouling member to continue to operate should an individual cell or group of cells malfunction, e.g., fail to inflate, leak, etc.

The inflation source may also be configured to inflate any number of cells 122 to pressures or shapes different from other cells 122. As discussed above, cells 122 may also be inflated and deflated repeatedly to disrupt and detach fouling material. In any of the embodiments described herein, an inflation apparatus may inflate a defouling device or portions thereof as necessary to disrupt and remove fouling material.

In the embodiments described above, the defouling device ejects the fouling material from the inner sidewall of the pipe with a radially-inward expansion that is the same along the length of the pipe. It is assumed in the above description that once the fouling material is no longer adhered to the sidewall, flow within the pipe will carry it away for disposal. That may not always be the case. For example, the flow within the pipe may be too slow to carry the material away with any certainty. In some embodiments, the working pressures and flow rates within the pipe may be temporarily lowered during a defouling procedure, potentially compounding the problem. It may also be the case that the fouling material is relatively sticky and is likely to redeposit downstream without further intervention. For this reason, FIGS. 11-24 are longitudinal sections of defouling devices according to other embodiments of the invention. As will be described below in more detail, the various defouling devices of FIGS. 11-24 inflate longitudinally and radially along the pipe and can thus be used to peristaltically "pump" ejected fouling material through and out of the pipe.

Because it contains detached fouling material, the material that is pumped will typically be a mixture of solids and liquids. This kind of peristaltic pumping may be advantageous at least in part because pumping solid/fluid mixtures is usually a difficult endeavor, due to the propensity of the solids to interact with, erode, or jam the pump.

In fact, while this description focuses largely on the use of peristaltic pumping to clear removed fouling material, in a more general sense, defouling devices 114 could be used to modify the flow within pipe 110, especially after fouling has been removed. For these purposes, flow modifications might include generating flow in pipe 110, speeding up the flow within pipe 110, slowing the flow within pipe 110, reversing the flow within pipe 110, and stopping the flow within pipe 110. As for slowing the flow within pipe 110, while much of this description assumes that the defouling devices 114 are arranged to push the fouling material S in the direction of the pipe flow F, in some embodiments, defouling devices 114 could be arranged in mirror-image fashion to push against the direction of the pipe flow F. These "backwards" defouling devices 114 may be on a separate inflation circuit, so that they are only inflated if desired, and they may be interspersed with traditionally-oriented devices 114. If the user desires to stop the flow within the pipe 110, defouling devices 114 could simply be inflated enough to block the lumen of the pipe 110. Depending on flow rates, pressures, and the material characteristics of defouling devices 114, such an arrangement may or may not effectively replace traditional valves or block the flow in the pipe 110 alone, but may serve as an effective supplement to any valves or other flow-control devices that are installed in pipe 110.

Figure 11:
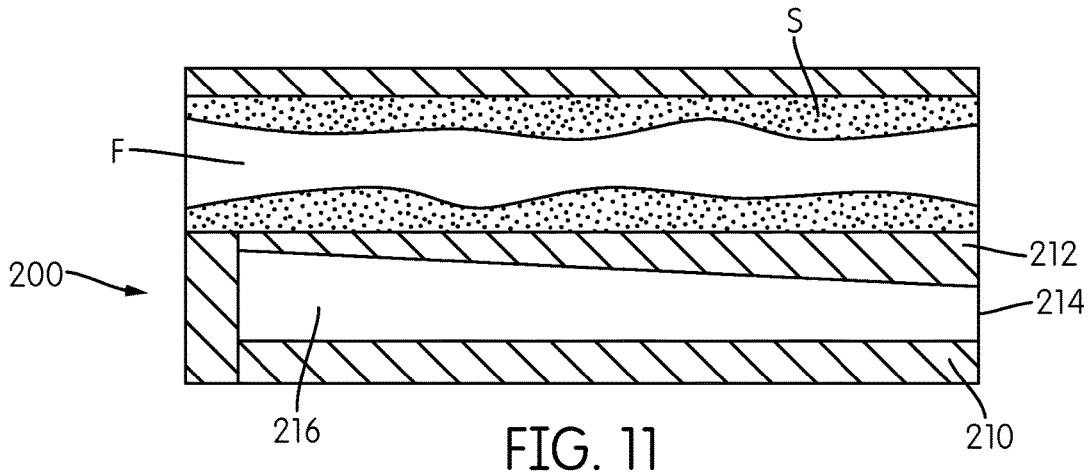
FIGS. 11-13 are longitudinal sections of a defouling device according to another embodiment of the invention.
Figure 12:
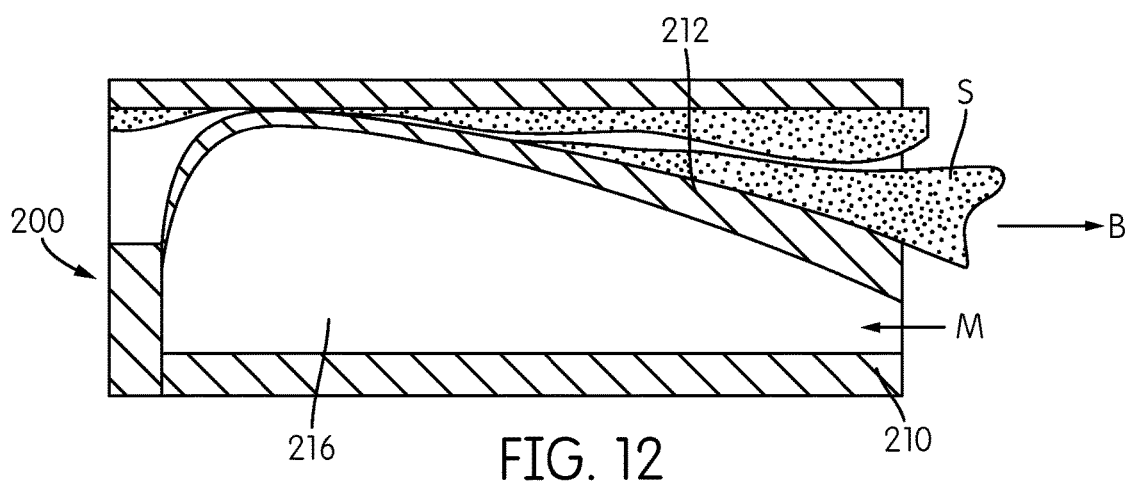
Figure 13:
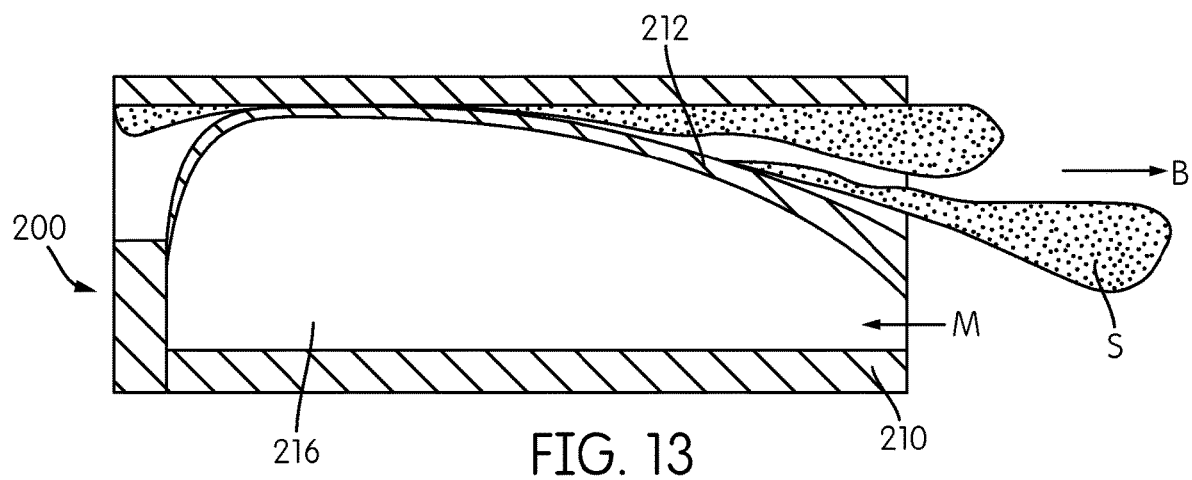

FIGS. 11-13 are longitudinal sections of a defouling device 200 capable of pumping along the length of the pipe. Defouling device 200 defines a flow path F and includes an outer wall 210, an inner wall 212, and a port 214. Outer wall 210 and inner wall 212 define at least one expandable cell 216. Inner wall 212 is configured to controllably expand in a longitudinal direction of the defouling device 200 by a change in thickness along inner wall 212. FIG. 11 shows inner wall 212 having a thickness that increases along the longitudinal direction of defouling device 200. Thinner portions of inner wall 212 are configured to expand at a lower pressure than thicker portions thereof. When an inflation medium M is introduced into expandable cell 216 through port 214, thinner portions of inner wall 212 expand into flow path F before thicker portions thereof, as can be seen in FIG. 12. As pressure increases in expandable cell 38, thicker portions of inner wall 212 expand, as shown in FIG. 13.

As explained previously, changes in shape, strains, and rubbing contact contribute to disruption and detachment of fouling material S that has accumulated and constricted flow path F upon expansion of cell 216. Expansion of cell 216 mechanically breaks up and ejects fouling material S, in the same way as described above. Additionally, the controlled longitudinal expansion of cell 216, using thickness variation to control which parts expand first, forces material along flow path F as a form of peristaltic pump. Thus, as shown in FIG. 12, defouling device 200 detaches fouling material S from the flow path F and forces detached material in the longitudinal direction of arrow B for removal therefrom.

The actual amount of peristaltic pumping force supplied by the defouling device 200 will vary from embodiment to embodiment and need not be particularly great. For example, a low durometer silicone with a 3.5 degree longitudinal change in wall thickness from 0.15 cm to 0.215 cm, across approximately 2 cm longitudinally, has been shown to generate longitudinally-differentiated expansion at approximately 10 kPa and complete expansion at 30 kPa. In some embodiments, it may be sufficient if the defouling device 200 merely serves as a valve to prevent backflow of the freed fouling material S.

Defouling device 200 may be provided within a pipe to expel fouling material from the pipe in any suitable manner. For example, defouling device 200 may be attached to an interior surface of a pipe or formed integrally with the pipe, as described above.

Figure 14:
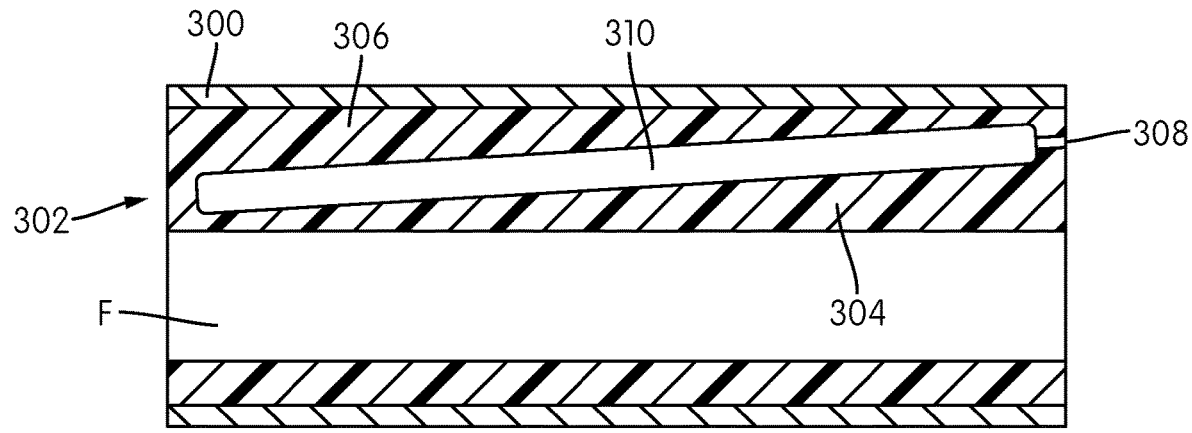
FIGS. 14-16 are longitudinal sections of a pipe and a defouling device according to another embodiment of the invention.
Figure 15:
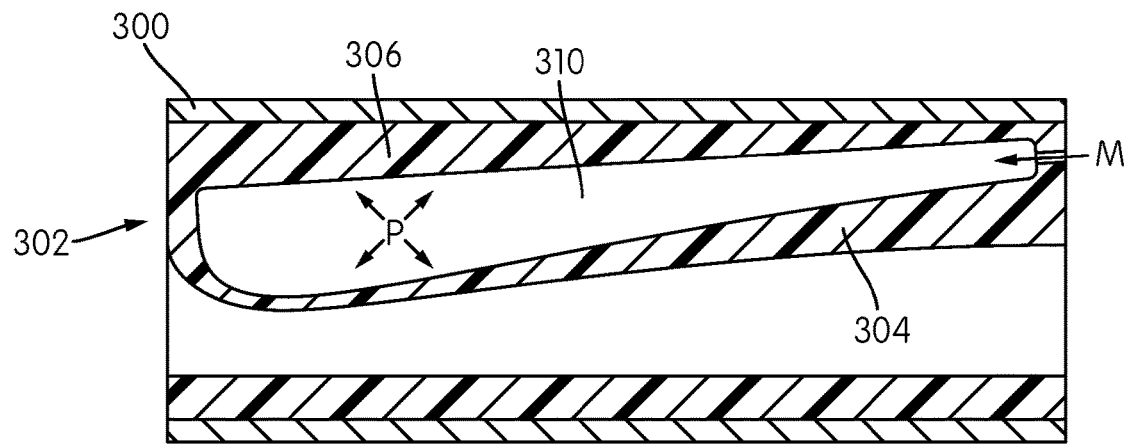
Figure 16:
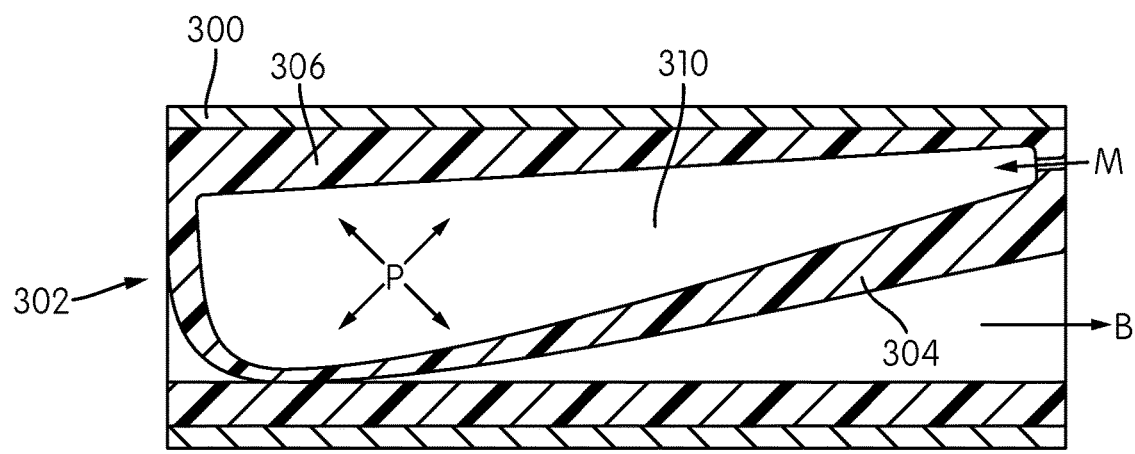

FIGS. 14-16 are longitudinal sections of a pipe 300 and a defouling device 302 according to a further embodiment. Defouling device 302 defines a flow path F, an inner wall portion 304, an outer wall portion 306, a port 308, and an expandable cell 310. FIG. 14 shows expandable cell 310 having a substantially uniform unexpanded shape. Expandable cell 310 is inclined with respect to the longitudinal axis of pipe 300 and defouling device 302 such that cell 310 defines thinner and thicker regions in inner wall portion 304. As shown in FIGS. 15 and 16, thinner regions of inner wall portion 304 expand into flow path F before thicker regions thereof as inflation medium M is introduced into expandable cell 310. As pressure P increases in expandable cell 310, thicker regions of inner wall portion 304 expand into flow path F, forcing material along the flow path F in the direction of arrow B.

Figure 17:
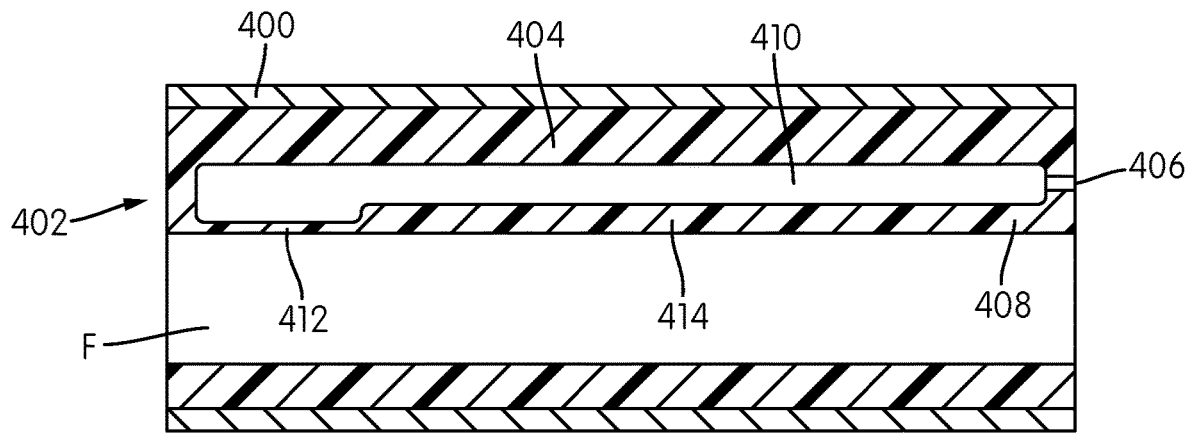
FIGS. 17-19 are longitudinal sections of a pipe and a defouling device according to another embodiment of the invention.
Figure 18:
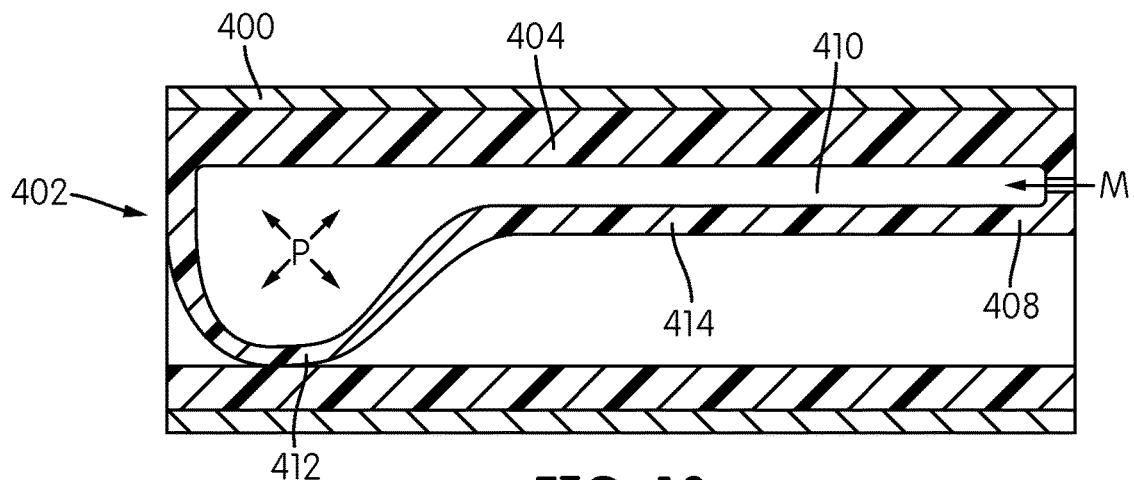
Figure 19:
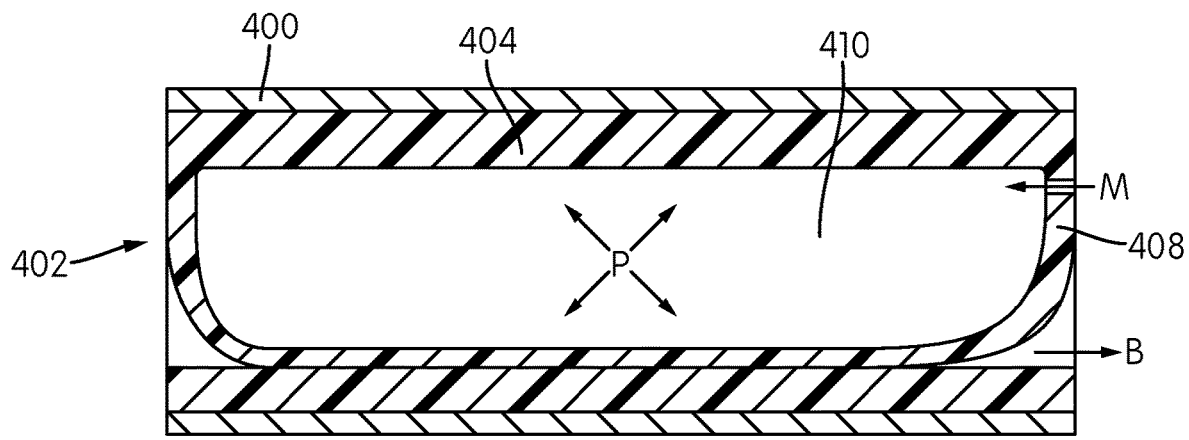

FIGS. 17-19 are longitudinal sections of a pipe 400 and a defouling device 402 according to a further embodiment. Defouling device 402 defines a flow path F and includes an outer wall portion 404, a port 406, inner wall portion 408, and an expandable cell 410. The inner wall portion 408 is configured to controllably expand in a longitudinal direction of the defouling device 402 in a stepwise manner.

As can be seen in FIG. 17, inner wall portion 408 defines at least a first step 412 and a second step 414. First step 412 has a thickness less than that of second step 414. FIG. 18 illustrates how the thinner first step 412 expands into flow path F before the thicker second step 414 as inflation medium M is introduced into expandable cell 410. As pressure P increases in expandable cell 410, the thicker second step 414 expands into flow path F, forcing material along the flow path F in the direction of arrow B, as shown in FIG. 19. Although two steps are shown, any number of steps may be formed in the inner wall to achieve peristaltic pumping force.

Figure 20:
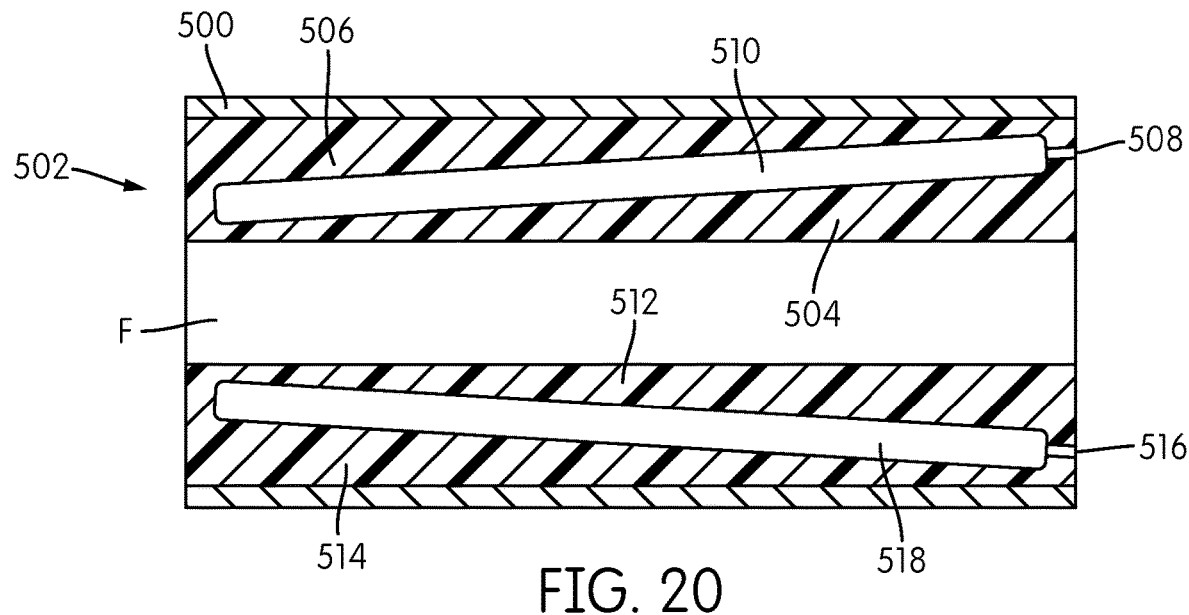
FIG. 20 is a longitudinal section of a pipe and a defouling device according to another embodiment of the invention.

FIG. 20 is a longitudinal section of a pipe 500 and a defouling device 502 according to another embodiment. Defouling device 502 defines a flow path F, a first inner wall portion 504, a first outer wall portion 506, a first port 508, and a first expandable cell 510. Additionally, defouling device 502 defines a second inner wall portion 512, a second outer wall portion 514, a second port 516, and a second expandable cell 518. First expandable cell 510 and second expandable cell 518 expand and function in a similar manner as the expandable cell 310 shown in FIGS. 14-16.

First expandable cell 510 and second expandable cell 518 can be simultaneously inflated to pump material through flow path F. In some applications, first port 508 and second port 516 are connected to a single inflation apparatus. In other applications, the first expandable cell 510 and second expandable cell 518 are connected by a small channel or opening (not shown) in the wall of defouling device 502 that is connected to an inflation source so pressures are equalized between the first expandable cell 510 and second expandable cell 518.

The specific number and position of expandable cells in a defouling device can be selected based on a number of considerations including, but not limited to, the type of fouling material to be removed, the diameter of the flow path F, the desired amount of expansion of the expandable cells, similar to channels 22 discussed above, as well as the desired peristaltic pumping force. For example, FIG. 14 illustrates defouling device 302 having a single expandable cell, while FIG. 20 shows defouling device 502 has two expandable cells. In other embodiments, more expandable cells (e.g., three cells, four cells, five cells, one hundred cells, etc.) may be provided in a defouling device. As a general point, applicable to all of the embodiments described here, the more expandable cells or channels there are, the more selectivity the user has in choosing where and how to inflate those cells to dislodge various types of fouling. That may be particularly helpful for unevenly-deposited fouling. Additionally, smaller expandable cells or channels may be able to sustain larger strains without expanding so much that they occlude the lumen of the pipe in which they are installed.

In some embodiments, two or more expandable cells are positioned at differing intervals so that the cells are not evenly circumferentially spaced. Thus if, for example, experience shows that fouling material deposits unevenly around the circumference of a pipe, the defouling device could be structured and installed so as to place expandable cells in the areas that are most affected by fouling. Without being limited to any particular theory, increasing the number of inflatable cells may improve disruption of fouling material by optimizing the interaction between the cells, improving rubbing contact between expanded cells, reducing gaps where fouling material may accumulate, improving overall inflation of a defouling device as expanded cells contact and help "push" inflation media through the cells, and/or improving contact between expanded cells to form a better seal for pump or valve function.

Further, in some applications where a defouling device includes two or more expandable cells, one or more of the expandable cells may take any of the forms described with respect to other embodiments of the invention.

Figure 21:
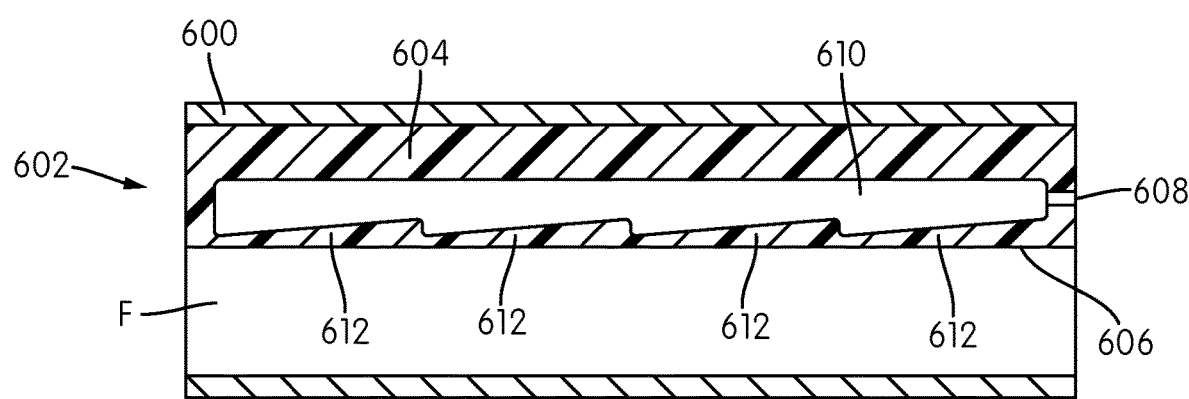
FIG. 21 is a longitudinal section of a pipe and a defouling device according to another embodiment of the invention.

FIG. 21 is a longitudinal section of a pipe 600 and a defouling device 602 according to another embodiment. Defouling device 602 defines a flow path F and includes an outer wall portion 604, an inner wall portion 606, a port 608, and an expandable cell 610. Portions of inner wall 606 are configured to simultaneously expand in a longitudinal direction in series.

Inner wall portion 606 defines at least two regions 612 of varying thickness, providing inner wall portion 606 with multiple thinner sections and thicker sections. Similar to the inner walls in FIGS. 14 and 17, when an inflation medium is introduced into expandable cell 610, thinner sections of inner wall portion 606 expand into flow path F before thicker portions thereof. As pressure increases in expandable cell 610, thicker sections of inner wall portion 606 expand into flow path F as well.

Figure 22:
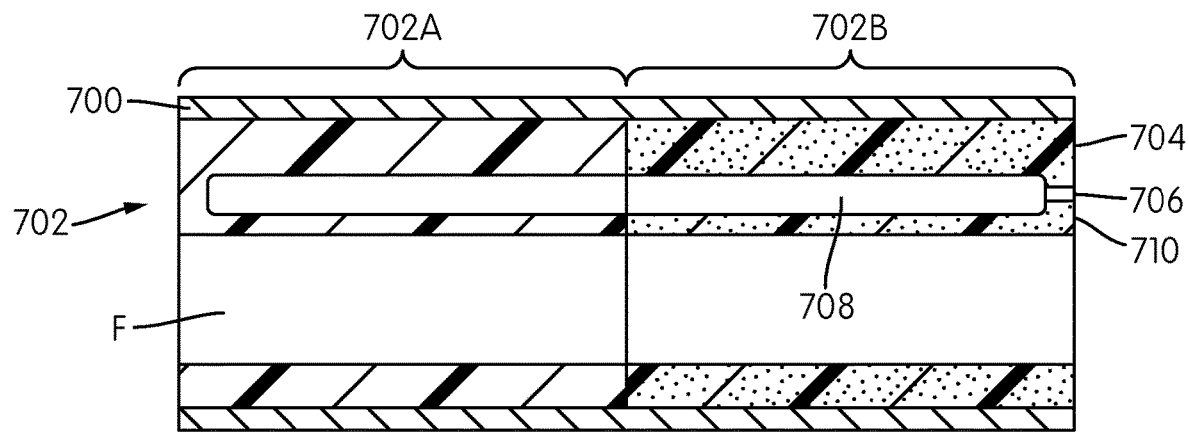
FIGS. 22-24 are longitudinal sections of a pipe and a defouling device according to another embodiment of the invention.
Figure 23:
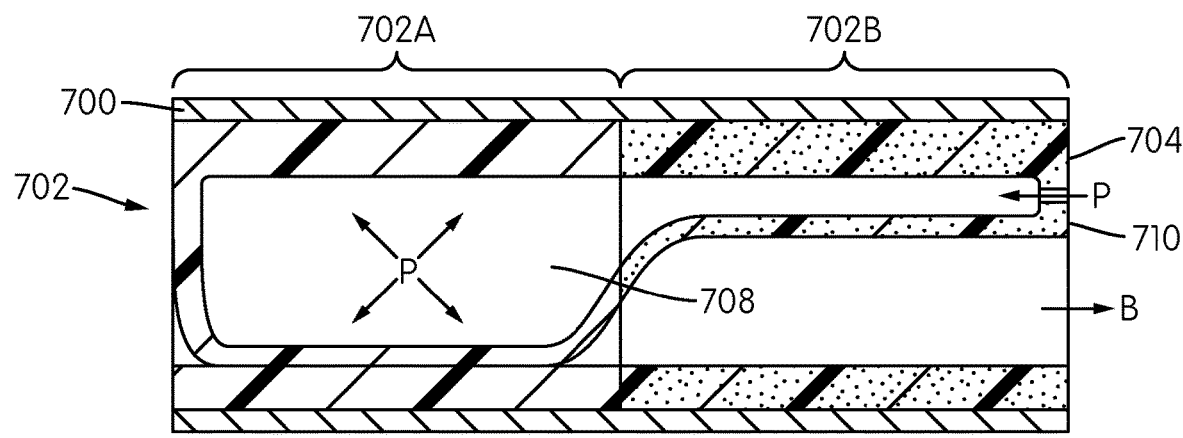
Figure 24:
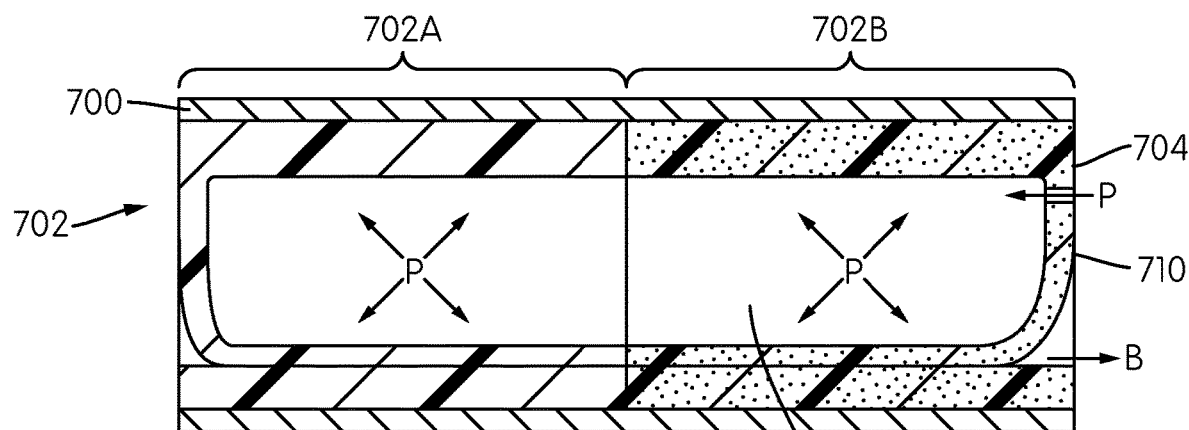

In the "peristaltic pumping" embodiments described above, it was assumed that the same material defines substantially all of expanding portions of the device; as was described at length, the pumping action is created by differences in shape, thickness, and other physical properties that cause one section to inflate or expand before the others. However, there are other ways to accomplish that function. FIGS. 22-24 are longitudinal sections of a pipe 700 and a defouling device 702. Defouling device 702 defines a flow path F and includes an outer wall portion 704, a port 706, an expandable cell 708, and an inner wall portion 710 having different mechanical properties along its length to controllably expand in a longitudinal direction of the defouling device 702.

Defouling device 702 includes at least two regions 702A, 702B having different mechanical properties. The different mechanical properties of the two regions 702A, 702B cause the two regions to expand in a specific way or order relative to one another, creating a peristaltic or directional pumping effect. Most often, the mechanical property that is different will be the elastic modulus, which essentially represents a ratio of the stress that is induced in a material for a particular level of applied strain. Of course, as those of skill in the art will appreciate, elastic modulus is relatively difficult to measure, requiring extensive specialized test equipment. Thus, as a practical matter, in creating embodiments of the invention, there are a number of material properties that can be used as good proxies for elastic modulus, i.e., material properties that have a predictable relationship with the elastic modulus of the material but are easier to measure. Durometer shore hardness is one such property that is more easily measured and more frequently reported for elastomers.

In one application, the inner wall portion 710 in region 702A has a lower elastic modulus than that of the inner wall portion 710 in region 702B. Thus, as can be seen in FIG. 23, when inflation medium M is introduced into expandable cell 708, the inner wall portion 710 in region 702A expands before the region of inner wall portion 710 in region 702B. FIG. 24 shows that as pressure P increases in expandable cell 708, the inner wall portion 710 in region 702B expands into flow path F, forcing material along the flow path F in the direction of arrow B.

The mechanical properties of a defouling device inner wall portion can be varied in any suitable manner. In the embodiment of FIG. 22, each of region 702A and region 702B are formed of separate material and joined together by suitable methods, such as adhesive or other forms of bonding. In other embodiments, a defouling device may be formed of a single material whose mechanical properties are modified along its length. In applications where a defouling device is formed of silicone elastomer, an inner wall of the defouling device can be exposed to ultraviolet light for different durations along its length to modify the elastomers elastic modulus. Other suitable methods, such as dip-process chemical treatment, may also be used to modify mechanical properties of the defouling device.

In the description of the peristaltic pumping embodiments above, defouling devices 200, 302, 402, 502, 602, 702 were shown as having only a single expandable cell, for ease of illustration and description. However, as was noted above with respect to other embodiments, there may be any number of expandable cells in a particular embodiment, and in many cases, pairs of expandable cells may oppose one another across the diameter of the device. If pairs of expandable cells oppose one another, they may be aligned so that respective portions of opposed expandable cells are aligned with one another. In other cases, though, opposed expandable cells may be somewhat longitudinally offset from one another, such that, for example, the crest of the upper expandable cell is aligned with the trough of the lower expandable cell, or vice-versa. Staggering opposed expandable cells in this fashion may provide some benefit in pumping material through the pipe.

Any number of defouling devices may be used dislodge fouling material from a pipe. The embodiments discussed above illustrate use of a single defouling device. In some embodiments, multiple defouling devices may be included along a pipe for disrupting and detaching fouling material. The defouling devices may be joined together and actuated simultaneously, sequentially, or in a particular order, or with particular timing to extend their effect throughout the pipe.

The figures illustrate usefulness of the defouling devices of the invention with pipes having a generally circular cross-sectional shape. In some embodiments, defouling devices are configured to disrupt and remove fouling material from pipes having polygonal or other non-circular cross-sections.

Figure 25:
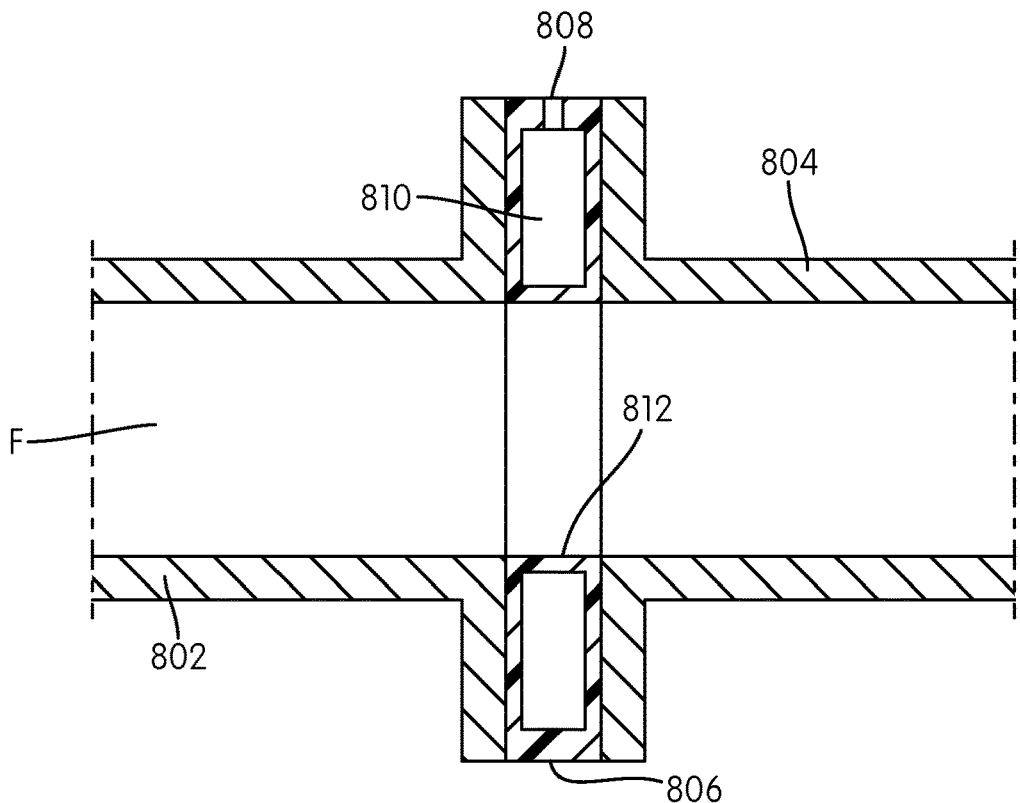
FIGS. 25-28 illustrate a defouling device configured as a gasket according to another embodiment of the invention.
Figure 26:
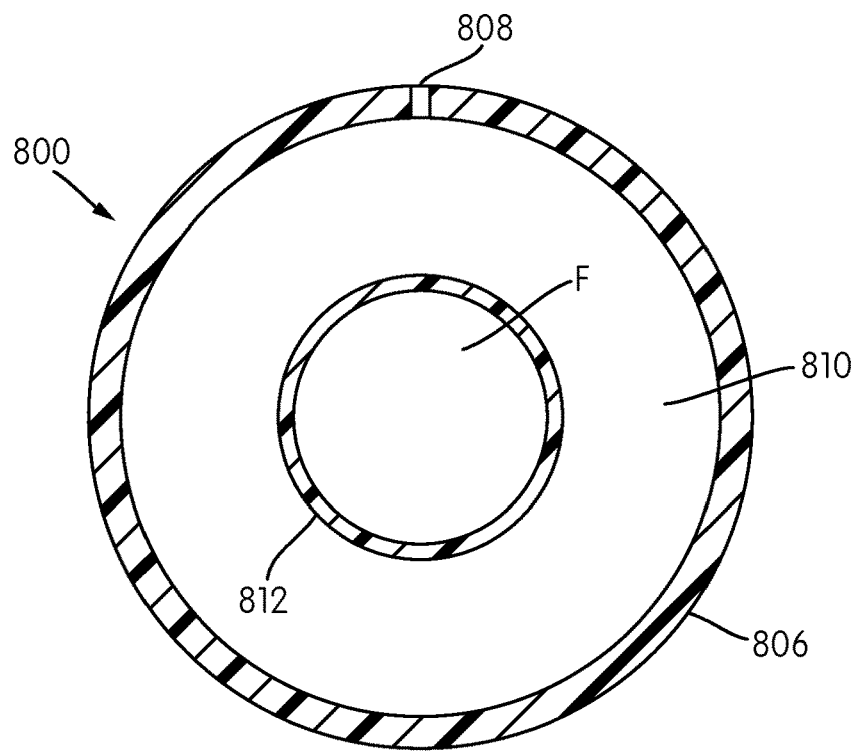

FIGS. 25-28 illustrate another embodiment of a defouling device configured as a gasket 800. Generally speaking, a gasket is an elastomeric member, often round or square, that is used to make seals between adjacent sections of pipe and other mechanical elements. Often, biofilm or other fouling material accumulates on gaskets between sections of joined pipes. In FIG. 25, defouling gasket 800 is shown sealing a joint between a first pipe 802 and a second pipe 804 to maintain a flow path F. As shown in FIG. 26, defouling gasket 800 includes an outer wall portion 806, a port 808, an expandable cell 810, and an inner wall 812. Thus, defouling gasket 800 performs the traditional function of a gasket in maintaining a seal between two components, but also has the attributes of a defouling apparatus according to the present invention.

Figure 27:
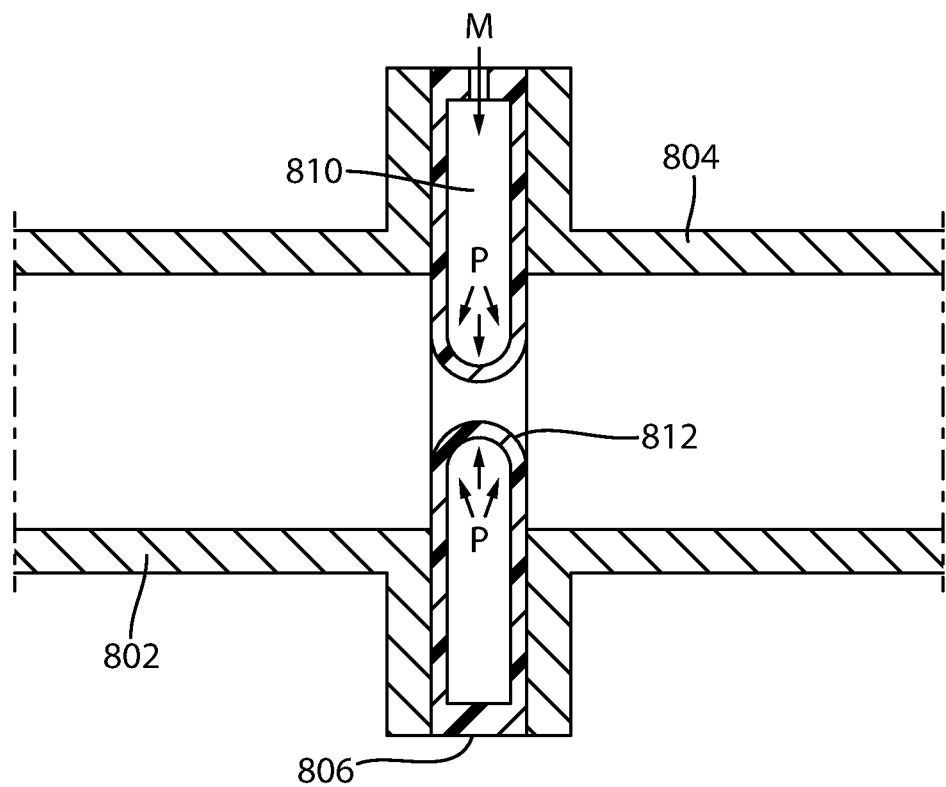
Figure 28:
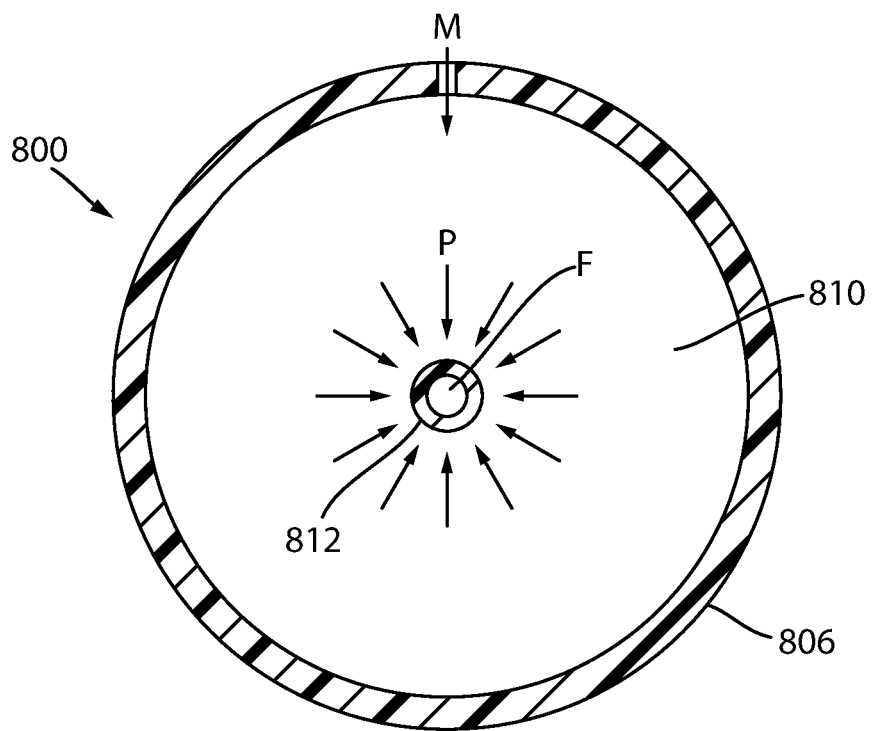

As can be seen in FIGS. 27 and 28, when inflation medium M is introduced into expandable cell 810, pressure P in expandable cell 810 increases and inner wall 812 expands into flow path F. As explained previously, changes in shape, strains, and rubbing contact contributes to disruption and detachment of fouling material from defouling gasket 800 upon expansion of expandable cell 810.

The cross-sectional shape of defouling gasket 800 may be selected to effectively seal a pipe or pipe joint. In FIG. 25 defouling gasket 800 has a generally circular cross-sectional shape. In other embodiments, defouling gasket 800 may have a polygonal or other cross-sectional shape sufficient to join two pipes or otherwise seal a pipe. Further, defouling gasket 800 may incorporate any of the structures discussed in this application suitable for disrupting detaching fouling material.

The defouling devices of the invention are able to repeatably disrupt and remove fouling material from a pipe. Defouling devices may be formed with a pipe or attached to existing pipes, including those already in use. Repeatable, on-demand removal of fouling material from a pipe serves to restore flow path and extend useful lifespan of the pipe.

All references referred to in this description are hereby incorporated by reference herein in their entireties.

While the invention has been described with respect to certain embodiments, the description is intended to be exemplary, rather than limiting. Modifications and changes may be made within the scope of the invention, which is defined by the appended claims.

What is claimed is:

1. A method, comprising:
    defouling a portion of a pipe having a defouling device fixedly installed along an interior luminal surface of the pipe, the defouling device having
        a pressure source,
        a flow selector in fluid communication with the pressure source,
        a controller coupled to the pressure source and the flow selector, and
        a plurality of expandable cells placed selectively in fluid communication with the pressure source by the flow selector so as to receive an inflation medium from the pressure source, each of the plurality of expandable cells having a circumferential extent and a longitudinal extent along the interior luminal surface of the pipe, and an expandable inner wall with a varying wall property that varies in a predefined pattern along the longitudinal extent of the expandable cell so as to cause differential inflation along the longitudinal extent of the expandable cell,
said defouling comprising inflating selected ones of the plurality of expandable cells by actuating the pressure source and the flow selector to supply the inflation medium to the selected ones of the plurality of expandable cells, said inflating (1) occurring differentially across and along the interior luminal surface of the pipe in accordance with the circumferential extents, the longitudinal extents, and the varying wall property of the selected ones of the plurality of expandable cells, and (2) inducing mechanical strain or deformation in fouled material overtop of the selected ones of the plurality of expandable cells;
    wherein the mechanical strain or deformation causes or allows the fouled material to break free.

2. The method of claim 1, wherein said inflating is such that first portions of the selected ones of the plurality of expandable cells inflate before second portions of the selected ones of the plurality of expandable cells.

3. The method of claim 1, wherein said inflating is such that first portions of the selected ones of the plurality of expandable cells distend to a greater extent than second portions of the selected ones of the plurality of expandable cells.

4. The method of claim 1, wherein said inflating generates a fluid flow within the pipe, increases the fluid flow within the pipe, decreases the fluid flow within the pipe, reverses the fluid flow within the pipe, or stops the fluid flow within the pipe.

5. The method of claim 1, wherein said inflating creates a peristaltic pumping action along the pipe.

6. The method of claim 1, wherein at least some of the selected ones of the plurality of expandable cells are adjacent or nearby cells and said inflating causes the adjacent or nearby cells to rub together, thereby improving removal of the fouled material.

7. The method of claim 1, wherein the plurality of expandable cells comprises a common base divided into individual cells by longitudinally-extending ribs.

8. The method of claim 1, wherein the varying wall property comprises a varying wall thickness.

9. The method of claim 1, wherein the varying wall property comprises a varying mechanical property.

10. The method of claim 9, wherein the varying mechanical property is elastic modulus or hardness.

* * * * *